(12) United States Patent
Laoufi et al.

(10) Patent No.: US 9,809,194 B2
(45) Date of Patent: Nov. 7, 2017

(54) VEHICLE SAFETY SYSTEM

(75) Inventors: Moroine Laoufi, Asnieres-sur-seine (FR); Alessandro Zin, Saint Oven l'Aumône (FR); Peter Harda, Torslanda (SE); Pär Nilsson, Mölndal (SE); Anders Axelsson, Torslanda (SE); Anders Wogel, Harrington Park, NJ (US)

(73) Assignees: Autoliv Development AB, Vargarda (SE); Volvo Car Corporation, Gothenburg (SE)

( * ) Notice: Subject to any disclaimer, the term of this patent is extended or adjusted under 35 U.S.C. 154(b) by 645 days.

(21) Appl. No.: 14/129,311

(22) PCT Filed: Jun. 25, 2012

(86) PCT No.: PCT/SE2012/050708
§ 371 (c)(1),
(2), (4) Date: May 19, 2014

(87) PCT Pub. No.: WO2013/006127
PCT Pub. Date: Jan. 10, 2013

(65) Prior Publication Data
US 2014/0324296 A1     Oct. 30, 2014

(30) Foreign Application Priority Data
Jul. 4, 2011 (EP) .................................... 11172573

(51) Int. Cl.
*B60R 22/48* (2006.01)
*B60R 21/01* (2006.01)
(Continued)

(52) U.S. Cl.
CPC .............. *B60R 22/48* (2013.01); *B60R 21/01* (2013.01); *B60R 2021/0013* (2013.01); *B60R 2021/01325* (2013.01); *B60R 2022/4808* (2013.01)

(58) Field of Classification Search
CPC ............ B60R 21/01; B60R 2021/0013; B60R 2021/01306; B60R 2021/01308;
(Continued)

(56) References Cited

U.S. PATENT DOCUMENTS 6,292,759 B1 * 9/2001 Schiffmann ............. B60T 8/172
340/440
6,327,528 B1 * 12/2001 Vallette ................. B60R 21/013
180/290
(Continued)

FOREIGN PATENT DOCUMENTS

DE           10235567 A1 * 2/2004 ......... B60R 21/0132
DE   10 2006 045 682 A1    2/2007
(Continued)

OTHER PUBLICATIONS http://www.physicsclassroom.com/Class/vectors/u3l2c.cfm#principles by Tom Henderson, accessed via the wayback machine on Feb. 15, 2010. (Henderson).*
(Continued)

*Primary Examiner* — Redhwan k Mawari
*Assistant Examiner* — Michael Whalen
(74) *Attorney, Agent, or Firm* — Brinks Gilson & Lione

(57) ABSTRACT

A safety system for a motor vehicle having at least a front wheel arrangement having one or more wheels and rear wheel arrangement having one or more wheels, the arrangement having: a control unit; and one or more vehicle inertial sensors to detect acceleration experienced by the vehicle, the inertial sensors being connected to the control unit so the
(Continued)

control unit receives output signals from the inertial sensors; and one or more vehicle safety systems which may be activated by the control unit, wherein the control unit is configured to process the signals received from the inertial sensors and to determine whether at least one of the wheels of the front and rear wheel arrangements is not in contact with the surface over which the vehicle is driven.

17 Claims, 1 Drawing Sheet

(51) Int. Cl.
  *B60R 21/00* (2006.01)
  *B60R 21/0132* (2006.01)
(58) Field of Classification Search
  CPC ......... B60R 2021/01325; B60R 22/48; B60W 2520/16; B60W 2720/16
  See application file for complete search history.

(56) References Cited

U.S. PATENT DOCUMENTS

| | | | |
|---|---|---|---|
| 6,904,350 B2 | 6/2005 | Lu et al. | |
| 2004/0010383 A1 | 1/2004 | Lu et al. | |
| 2006/0108156 A1* | 5/2006 | Heinzmann | B60L 11/007 |
| | | | 180/8.2 |
| 2006/0176158 A1* | 8/2006 | Fleming | B60R 16/0232 |
| | | | 340/425.5 |
| 2006/0178808 A1 | 8/2006 | Wu et al. | |
| 2006/0261937 A1* | 11/2006 | Lu | B60T 8/172 |
| | | | 340/446 |
| 2007/0185623 A1 | 8/2007 | Chen et al. | |
| 2007/0200323 A1* | 8/2007 | Bertele | B60N 2/427 |
| | | | 280/730.2 |
| 2009/0105906 A1 | 4/2009 | Hackney et al. | |
| 2009/0240399 A1 | 9/2009 | Dagenais et al. | |
| 2010/0168961 A1 | 7/2010 | Messih et al. | |
| 2011/0241318 A1* | 10/2011 | Miyajima | B60N 2/002 |
| | | | 280/730.1 |
| 2015/0100208 A1* | 4/2015 | Wogel | B60R 21/013 |
| | | | 701/45 |
| 2015/0274105 A1* | 10/2015 | Le Merrier | B60R 21/013 |
| | | | 701/45 |

FOREIGN PATENT DOCUMENTS

| | | | | |
|---|---|---|---|---|
| DE | 102012101274 A1 * | 8/2013 | ......... | B60T 8/17554 |
| DE | 102012101278 A1 * | 8/2013 | ......... | B60W 10/184 |
| DE | WO 2013120484 A2 * | 8/2013 | ......... | B60T 8/17554 |
| EP | 2 003 033 A1 | 12/2008 | | |
| EP | 2272723 A1 * | 1/2011 | ......... | B60R 21/0136 |
| EP | 2289753 A1 * | 3/2011 | ......... | B60R 21/0132 |
| FR | WO 2013162446 A1 * | 10/2013 | ......... | B60R 21/013 |
| GB | 2 314 187 A | 12/1997 | | |
| IT | WO 2007/096798 A2 | 8/2007 | | |
| SE | EP 2657089 A1 * | 10/2013 | ......... | B60R 21/013 |
| SE | EP 2868532 A1 * | 5/2015 | ......... | B60R 21/013 |
| SE | GB 2519947 A * | 5/2015 | ......... | B60R 21/013 |

OTHER PUBLICATIONS http://www.physics.usyd.edu.au/~cross/PUBLICATIONS/54.%20RampLaunch.pdf, by Rod Cross, published Oct. 2011 (Cross).*
PCT International Search Report—dated Nov. 20, 2012.

* cited by examiner

VEHICLE SAFETY SYSTEM

CROSS REFERENCE TO RELATED APPLICATIONS

This application claims priority to European Patent Application No. 11172573.5, filed Jul. 4, 2011; and PCT/SE2012/050708, filed Jun. 25, 2012.

FIELD OF THE INVENTION

The present invention relates to a motor vehicle safety system, and in particular a system for determining when at least some of the wheels of a vehicle leave the ground, for estimating the severity of the impact when the vehicle meets the ground again, and for assisting in protecting the occupants of the vehicle if this occurs.

BACKGROUND

It has previously been proposed to determine whether one or more wheels of a vehicle are no longer in contact with the ground. U.S. Pat. No. 6,904,350 discloses an arrangement in which the signals from inertial sensors are used to make a determination as to whether two wheels on the same side of a vehicle have lost contact with the ground, to assist in the early detection of a roll-over situation. US publication 2007/0185623 discloses an arrangement in which suspension sensors are provided, to gauge from the behaviour of the suspension systems associated with a vehicle's wheels whether the wheels are still in contact with the ground. This document is also concerned with the detection of roll-over situations.

It is an object of the present invention to provide an improved vehicle safety system of this type.

BRIEF DESCRIPTION a safety arrangement or system for a motor vehicle having at least a front wheel arrangement having one or more wheels and rear wheel arrangement having one or more wheels, the arrangement including: a control unit; and one or more vehicle inertial sensors to detect acceleration experienced by the vehicle, the inertial sensors being connected to the control unit so the control unit receives output signals from the inertial sensors; and one or more vehicle safety systems which may be activated by the control unit, wherein the control unit is configured to process the signals received from the inertial sensors and to determine whether at least one of the wheel arrangements is not in contact with the surface over which the vehicle is driven.

Advantageously, the inertial sensors include a vertical acceleration sensor, and wherein the control unit makes a determination that at least one of the wheel arrangements is not in contact with the surface if the vertical acceleration exceeds a predetermined vertical acceleration threshold.

Preferably, the inertial sensors include a pitch sensor, and the control unit makes a determination that at least one of the wheel arrangements is not in contact with the surface if the rate of pitch exceeds a predetermined pitch threshold.

Conveniently, the inertial sensors include a longitudinal acceleration sensor.

Advantageously, the control unit makes a determination that one or more of the wheel arrangements is not in contact with the surface if the vertical acceleration exceeds the predetermined vertical acceleration threshold and the longitudinal acceleration is below a predetermined longitudinal acceleration threshold.

Preferably, the vertical acceleration threshold is reduced if the longitudinal acceleration of the vehicle is below a predetermined longitudinal acceleration threshold.

Conveniently, the control unit makes a determination that one or more of the wheel arrangements is not in contact with the surface if the pitch rate is above a predetermined pitch threshold and the pitch rate is substantially not correlated with the longitudinal acceleration of the vehicle.

Advantageously, the control unit is operable to confirm a determination that one or more of the wheel arrangements is not in contact with the surface if the conditions leading to a determination that at least one of the wheel arrangements is not in contact with the surface persist in excess of a predetermined length of time.

Preferably, the control unit is operable, if the control unit makes a confirmed determination that one or more of the wheel arrangements is not in contact with the surface, to calculate an estimated severity of the impact when the one or more of the wheel arrangements vehicle makes contact with the surface again.

Conveniently, the estimated severity is based on the kinetic energy accumulated by the vehicle.

Advantageously, a reversible or irreversible seatbelt pretensioner is activated, while the one or more of the wheel arrangements is not in contact with the surface, if the estimated severity of the impact exceeds a predetermined threshold.

Preferably, a reversible or irreversible seatbelt pretensioner is activated, while the one or more of the wheel arrangements is not in contact with the surface, if the estimated severity of the impact is above a predetermined threshold, and the pitch angle of the vehicle exceeds a predetermined threshold.

Conveniently, the vehicle includes at least one front air-bag, and if a determination is made that one or more of the wheel arrangements is not in contact with the surface, the control unit is adapted to make a determination as to whether the front air-bag will triggered when the vehicle strikes the surface, and the control unit is operable to activate, while the one or more of the wheel arrangements is not in contact with the surface, a reversible or irreversible seatbelt pretensioner if it is determined that the front air-bag will be triggered.

Advantageously, the vehicle further includes an occupant out of position sensor, and wherein the seatbelt pretensioner will be activated if it is determined that the front air-bag will be triggered and the occupant is out of position.

Preferably, a seatbelt pretensioner is activated if a confirmed determination is made that one or more of the wheel arrangements is not in contact with the surface, and vehicle sensors indicate that the one or more of the wheel arrangements has made contact with the surface again.

Another aspect of the invention provides a vehicle incorporating a safety arrangement according to the above.

BRIEF DESCRIPTION OF THE DRAWINGS

In order that the invention may be more readily understood, embodiments thereof will now be described, by way of example, with reference to the accompanying drawings, in which.

DETAILED DESCRIPTION

Figure 1:
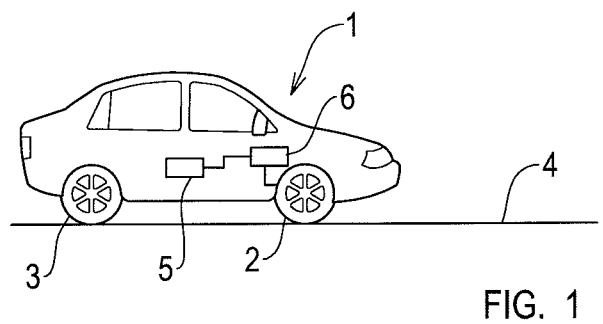
FIG. 1 shows a vehicle under normal driving conditions.

Referring firstly to FIG. 1, a vehicle 1 is shown in normal driving conditions on a flat road surface 4, with both the front wheels 2 and the rear wheels 3 of the vehicle 1 in contact with the road surface 4.

The vehicle 1 is equipped with sensors which are in one embodiment of the invention in the form of inertial sensors 5, at least some of which are preferably located at or near the center of gravity of the vehicle 1. However, the inertial sensors 5 may be distributed throughout the vehicle 1 and placed in any suitable locations, and indeed in some embodiments none of the inertial sensors may be located at or near the vehicle's center of gravity.

As used in this specification, inertial sensors include (but are not limited to) yaw rate sensors (for sensing yaw rate of the vehicle 1), roll rate sensors (for sensing roll rate of the vehicle 1), longitudinal acceleration sensors (for sensing longitudinal acceleration of the vehicle 1), lateral acceleration sensors (for sensing lateral acceleration of the vehicle 1), vertical acceleration sensors (for sensing vertical acceleration of the vehicle 1) and pitch rate sensors (for sensing pitch rate of the vehicle 1).

A control unit 6, having one or more on-board processors, is provided. Although the control unit is shown as one component, the processors making up the control unit 6 may be spread over several locations within the vehicle 1. The control unit 6 is connected to receive output signals from the inertial sensors 5. Embodiments of the present invention allow the control unit 6 to determine, through signals received from the vehicle sensors 5, whether one or more of the front pair of wheels 2 or whether one or more of the rear pair of wheels 3 have left the road surface so that the vehicle 1 is totally or partially airborne.

Figure 2:
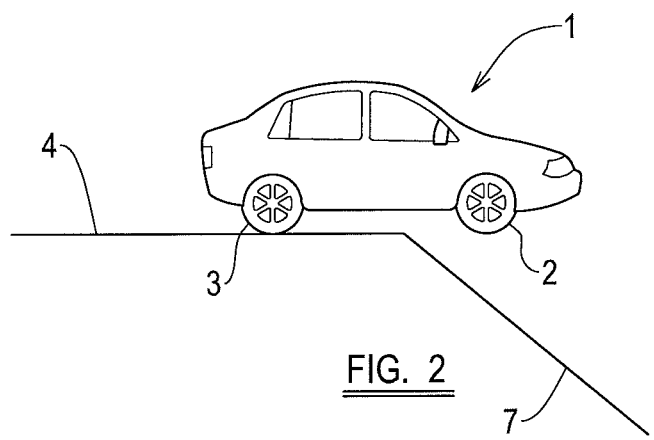
FIG. 2 shows the vehicle with the front pair of wheels out of contact with the road surface.
Figure 3:
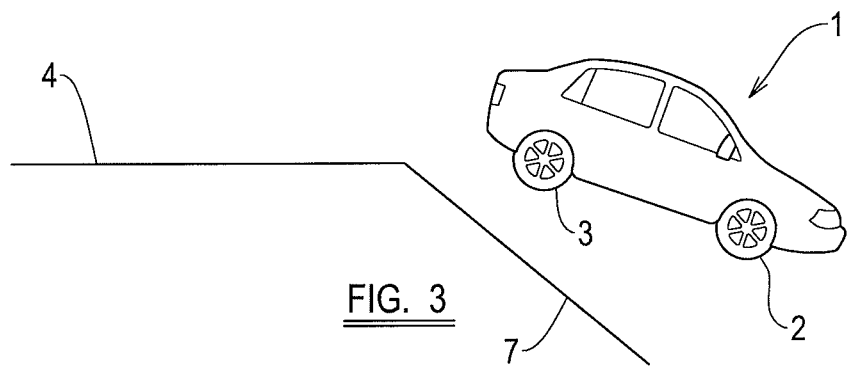
FIG. 3 shows the vehicle with both the front and rear pairs of wheels out of contact with the road surface.

Turning to FIG. 2, a schematic view is shown of the vehicle 1 encountering a steeply-sloped downhill section 7 of the road surface 4. As the vehicle 1 reaches this steeply-sloped section 7, one or more of the front wheels 2 lose contact with the road surface 4. FIG. 3 shows the situation at a later time, when none of the four wheels 2, 3 of the vehicle 1 are in contact with the road surface 4.

In the situation shown in FIG. 2, the vehicle 1 is considered to be partially airborne. In the situation shown in FIG. 3, the vehicle 1 is considered to be totally airborne. References in this specification to a vehicle being airborne may include both of these possibilities.

In preferred embodiments, the sensors 5 include a vertical acceleration sensor. When the vehicle 1 is at rest, or is driving under normal conditions as shown in FIG. 1, the acceleration sensor will register a default, "zero" or nominal setting, resulting from gravitational forces acting on the vertical acceleration sensor. However, when one or more of the front wheels 2 of the vehicle leave the road surface 4, 7, as shown in FIG. 2, the vehicle 1 will effectively be in freefall and the vertical acceleration sensor will register a change in acceleration equivalent to the vehicle experiencing a downward acceleration.

During the course of normal driving, the vehicle 1 will of course experience upward and downward acceleration as the vehicle negotiates slopes, hills, uneven surfaces, speed bumps and the like. However, vertical acceleration beyond a threshold has been found to be a relatively reliable indicator that the vehicle has left the road surface and has become airborne. In the sequence of events shown in FIGS. 1 to 3, the sensed vertical acceleration will change from around 10 m/s$^2$ to around zero, following removal of the reaction force arising from gravity. In one embodiment a change of around 10 m/s$^2$ may be used as the vertical acceleration threshold. However, in other situations where the vehicle 1 becomes airborne the change may be less, either because only some of the wheels 2, 3 of the vehicle 1 have left the ground, or because the sensed vertical acceleration before the vehicle 1 became airborne was less than m/s$^2$, for instance if the vehicle 1 was travelling over the brow of a hill. A lesser threshold, for instance 9 m/s$^2$, 8 m/s$^2$ or 7 m/s$^2$, may therefore be used.

In addition to the above, even relatively smooth road surfaces will have bumps, irregularities and texture. The vertical acceleration experienced by the vehicle 1 during normal driving conditions will therefore vary rapidly over a short timescales (e.g. over tenths of a second to seconds) as the vehicle 1 rides over the road surface. However, when the vehicle 1 becomes airborne, the bumps and irregularities in the road surface will not be communicated to the vehicle 1 (in the case of the vehicle 1 being partially airborne, the bumps and irregularities will be communicated to only some of the wheels) and so the changes in vertical acceleration over short timescales will be greatly reduced. This, in combination with a significant vertical acceleration, is also an indication that at least some of the vehicle's wheels 2, 3 are no longer in contact with the road surface 4.

In the sequence of events shown schematically in FIGS. 1 to 3 the road surface 4 effectively drops away sharply from the vehicle 1, causing one or more of the front wheels 2 and then one or more of the rear wheels 3 of the vehicle 1 to leave the road surface 4. However, in other situations, the vehicle 1 may encounter a bump or other raised feature in the road surface 4, for instance a speed bump, which may cause the vehicle 1 to become airborne. In this instance, the vehicle 1 will experience a sharp upward vertical acceleration, followed by a downward vertical acceleration indicative of being airborne, and once again this will be a reliable indicator that least some of the wheels 2, 3 of the vehicle 1 have lost contact with the road surface.

The above first embodiment uses vertical acceleration as the primary indicator of whether the vehicle 1 is airborne.

In preferred embodiments of the invention the vehicle sensors 5 further include a longitudinal acceleration sensor. When the vehicle 1 is airborne, the wheels 2, 3 of the vehicle 1 will not be able to apply an acceleration or braking force to the vehicle 1. The longitudinal acceleration of the vehicle 1 will therefore be low when the vehicle 1 is airborne. In some embodiments, a determination may be made that the vehicle 1 is airborne if the vertical acceleration of the vehicle 1 exceeds a threshold and also the longitudinal acceleration of the vehicle 1 is below a further threshold, which may for example be around 2 or 3 m/s$^2$.

In alternative embodiments, a determination is made as to whether the vehicle 1 is airborne by comparing the vertical acceleration against a threshold. However, if the longitudinal acceleration is below a threshold, then the threshold against which the vertical acceleration is measured may be reduced.

In a second embodiment of the invention, the vehicle sensors 5 include a pitch sensor, which measures the pitch rate of the vehicle 1. In the second embodiment a longitudinal acceleration sensor is again provided.

Under normal driving conditions, such as shown in FIG. 1, the pitch rate of the vehicle 1 is correlated with the longitudinal acceleration of the vehicle. If the vehicle 1 accelerates in a forward direction, the nose of the vehicle 1 will tend to rise. Conversely, if a braking force is applied to the vehicle 1, the nose of the vehicle 1 will tend to dip.

The vehicle will also experience changes in pitch as the vehicle negotiates hills, ramps and speed bumps. However, the rate of pitch associated with these events will be relatively low.

If the vehicle 1 becomes airborne, however, it is likely that the rate of pitch experienced by the vehicle 1 will be relatively high. In addition to this, the rate of pitch will be substantially not correlated with the longitudinal acceleration experienced by the vehicle 1. Also, as discussed above, while the vehicle 1 is airborne it is likely that the vehicle 1 will experience very low longitudinal acceleration. Therefore, a sharp rate of pitch of the vehicle 1, coupled with low longitudinal acceleration, is a reliable indicator that the vehicle 1 is totally or partially airborne. The rate of pitch that will indicate that the vehicle 1 is airborne may vary between different types of vehicle.

In some embodiments, a rate of pitch above a threshold may lead to a determination that the vehicle is airborne.

In other embodiments a determination is made that the vehicle is airborne if the pitch rate is above a certain threshold, and the pitch rate is substantially not correlated with the longitudinal acceleration of the vehicle.

In further embodiments a determination is made that the vehicle 1 is airborne if the pitch rate is above a certain threshold and the longitudinal acceleration is below a certain threshold.

In the first embodiments of the invention discussed above, a pitch sensor is preferably not provided. However, a pitch sensor may alternatively be used with these embodiments.

In the second embodiment discussed above, a vertical acceleration sensor is preferably not used. However, in alternative embodiments, a vertical acceleration sensor may be provided.

Elements of the first and second embodiments may be combined, and for instance a determination may be made that the vehicle is airborne if the vehicle experiences a high vertical acceleration, and the rate of pitch exceeds a threshold, and the longitudinal acceleration is below a threshold. Combining indications in this manner will help to reduce the possibility of the control unit 6 making either a "false positive" or "false negative" determination that the vehicle 1 is airborne.

It will be understood that the embodiments discussed above are useful in determining whether one or more of the pair of front wheels 2, and/or one or more of the pair of rear wheels 3, have lost contact with the road surface 4 (as opposed to two wheels on the same side of the vehicle 1 leaving the road surface at the same time, for instance in a sharp turn or roll-over situation).

In embodiments of the invention the control unit 6 confirms a determination that the vehicle is airborne by monitoring the outputs from the various sensors 5. If the conditions indicating that the vehicle 1 is airborne continue for a predetermined length of time, which may for example be around 200 ms, the determination will be confirmed.

For a confirmed determination that the vehicle 1 is airborne, other factors can be taken into account in addition, or as an alternative, to the factors discussed above.

In preferred embodiments of the invention, the vehicle sensors 5 include a lateral acceleration sensor. While the vehicle 1 is airborne, the lateral acceleration is likely to be very low. If the lateral acceleration experienced by the vehicle 1 remains less than a threshold over the time period in question, this is an indication that the vehicle 1 is airborne.

In further embodiments, the vehicle sensors may include a roll sensor, which detects the rate of roll of the vehicle 1. If the rate of roll is higher than a predetermined threshold over the time period in question, this would also indicate that the vehicle 1 is airborne.

In addition to the above, the roll rate experienced by the vehicle 1 will, in normal driving conditions, generally be correlated with the lateral acceleration experienced by the vehicle 1. If the vehicle 1 performs a sharp left-hand turn, the vehicle 1 will roll to the right, and vice versa. However, if the rate of roll of the vehicle 1 is above a threshold over the time period in question, and this rate of roll is substantially not correlated with the lateral acceleration experienced by the vehicle 1, then this is generally a reliable indicator that the vehicle 1 is airborne.

In preferred embodiments of the invention, only inertial sensors are used to make a determination as to whether the vehicle 1 is airborne. This is preferred because the majority of modern vehicles include these sensors, and therefore a reliable determination can be made based on the available information without the requirement for additional sensors to be installed. In some embodiments of the invention, only inertial sensors are used to determine whether the vehicle 1 is airborne.

Other indicators may also be used. For instance, the control unit 6 may be connected to receive signals from the brake and/or accelerator pedals of the vehicle. If one or both of these pedals is depressed or if the wheel brakes are actuated without driver intervention, but there is no corresponding change in longitudinal acceleration of the vehicle, this is a reliable indication that at least the drive wheels of the vehicle 1 are not in contact with the road surface 4, and therefore that the vehicle 1 is airborne.

The control unit 6 may also be connected to receive signals indicating the rate of rotation of one or more of the vehicle's wheels 2,3. If the driver accelerates or brakes (or the brakes are otherwise actuated) then the wheel speeds may increase or decrease sharply. If this is not accompanied by a corresponding change in the longitudinal acceleration of the vehicle 1 (or in the longitudinal speed of the vehicle, e.g. as measured by a GPS system), this will once again be an indicator that the wheels 2, 3 in question are not in contact with the road surface 4, and that the vehicle 1 is airborne.

The control unit 6 may further be connected to receive signals indicating the rotational position of the steering wheel. If the driver turns the steering wheel, and this is not accompanied by a lateral acceleration/change of direction of the vehicle, this will indicate that at least the wheels of the vehicle 1 that are involved with steering are not in contact with the road surface 4.

One or more suspension sensors may be provided, to monitor the activity of the suspension associated with the vehicle's wheels 2, 3. For instance, suspension force sensors may be used. If a wheel of the vehicle 1 leaves the road surface 4, the forces acting on the suspension associated with that wheel will drop to zero, or a very low level, and this can be used to help reach determination that the vehicle 1 is airborne. Alternatively, suspension height sensors may be provided. It will be understood that if a wheel of the vehicle 1 leaves the ground then the effective height of the vehicle above the wheel will increase, and once again this will provide an indication that the vehicle 1 is airborne. Either of the above may apply to active or passive suspension systems. It is also envisaged that the sensors need not be located directly on the components of the suspension systems. For instance, in some active suspension systems sensors may be located within the tyres of the vehicle 1, and may measure parameters such as pressure, vertical load and acceleration along one, two, three or more axes. Such sensors may transmit information to the vehicle's systems, and this information can then be used in the control of the active suspension system.

By using inputs from a greater number of different sensors a more accurate determination may be reached that the vehicle 1 is airborne. It is therefore preferred to use inputs from as many available sensors as possible, to increase the robustness of the determination process.

In preferred embodiments of the invention, once the control unit 6 makes a confirmed determination that the vehicle 1 is airborne, the control unit 6 proceeds to an assessment of the likely severity of the impact when the vehicle 1 strikes the ground. In preferred embodiments this is achieved by calculating the kinetic energy accumulated by the vehicle 1 while it is airborne. In one embodiment, the energy may be approximated using the following formula:

$$\int_0^\tau M \cdot A \cdot V \cdot \partial \tau$$

Where M is the total mass of the vehicle A is the acceleration of the vehicle, V is the vehicle's velocity and τ is the time over which the vehicle 1 is airborne. The control unit 6 may estimate the position of the road surface 4 relative to the vehicle 1, or may alternatively/additionally rely on vehicle sensors such as one or more forward-facing cameras, radar and/or lidar, to sense or estimate the distance to the road surface 4, and/or the angle of the road surface 4 with respect to the vehicle 1, and hence to predict when the vehicle 1 will strike the road surface 4.

In order to protect the occupants of the vehicle 1 when the vehicle 1 strikes the road surface 4, one or more occupant protection systems may be activated. For instance, a reversible (e.g. motorised) seatbelt pretensioner, an irreversible (e.g. "pyrotechnic") seatbelt pretensioner, one or more air-bags (for instance a front air-bag), reversible knee padding elements, door or roof window closing systems, reset systems for the seat backs, the steering wheel and/or the steering column, or systems to alter the stiffness of the vehicle's suspension may be triggered.

In some embodiments of the invention, a reversible seatbelt pretensioner will be activated whenever the control unit 6 makes a confirmed determination that the vehicle 1 is airborne. In some embodiments an irreversible seatbelt pretensioner may be activated as soon as a confirmed determination is made that the vehicle 1 is airborne, however this is not preferred.

In other embodiments, an irreversible seatbelt pretensioner is activated when a confirmed determination is made that the vehicle 1 is airborne, and the likely severity of the impact when the vehicle 1 meets the road surface 4 is above a certain threshold (i.e. the energy accumulated by the vehicle 1 exceeds a threshold).

In embodiments of the invention where a pitch sensor is provided, a seatbelt pretensioner may be activated while the vehicle 1 is airborne if the pitch angle of the vehicle 1 is above a threshold (e.g. if the nose of the vehicle 1 has dipped by more than a predetermined amount), as well as the likely severity of the impact when the vehicle 1 meets the road surface 4. Clearly, if the vehicle 1 tilts forward then it is important to ensure that the occupant is pulled back against the seat in preparation for the vehicle 1 striking the road surface 4.

In yet further embodiments, a reversible or irreversible seatbelt pretensioner is activated when a confirmed determination is made that the vehicle 1 is airborne, and the vehicle sensors then indicate that the vehicle 1 has struck the ground.

It is likely that the vehicle 1 will have a front air-bag positioned in front of at least one occupant. Typically, this air-bag will be triggered if the longitudinal acceleration experienced by the vehicle exceeds a predetermined threshold. In some embodiments, if a confirmed determination is made that the vehicle 1 is airborne, this threshold may be reduced, so that the front air-bag is triggered readily when the vehicle strikes the ground.

In some embodiments the vehicle's sensors may include one or more occupant out of position sensors. These sensors may include one or more infrared beam generators and detectors located within the vehicle cabin, to detect the position of the occupant. If the occupant is out of position (for instance, leaning forward) it is additionally important for a seatbelt pretensioner to be activated, to pull the seat occupant into the correct position before the vehicle 1 strikes the ground. Not only will this help minimise injuries as the vehicle strikes the ground, but if a front air-bag is to be triggered then there is a risk of serious injuries to the vehicle occupant if the occupant is leaning forward as the air-bag is activated.

In preferred embodiments the control unit 6 is operable, once a confirmed determination has been made that the vehicle 1 is airborne, to estimate the forces that will arise when the vehicle 1 strikes the road surface 4, and hence to work out whether the air-bag will be triggered when the vehicle 1 strikes the road surface 4. A seat belt pretensioner (preferably an irreversible pretensioner) may be activated while the vehicle is still airborne if it is predicted that the air-bag will be triggered upon impact. In further embodiments, the pretensioner will additionally only be activated if it is determined that the occupant is out of position.

The description above relates to a four-wheeled vehicle, with a front pair of wheels and a rear pair of wheels. However, a skilled person will appreciate that the invention may apply equally to vehicles with different numbers of wheels, for instance a three-wheeled vehicle having one pair of wheels at the front or rear of the vehicle, and a single wheel at the other of the front and rear. The invention may also apply to two-wheeled vehicles such as motorcycles. In general, the invention applies to vehicles having a front wheel arrangement and a rear wheel arrangement, where each wheel arrangement has one or more wheels. If there are two or more wheels in a front or rear wheel arrangement, these wheels are generally aligned with one another in a direction perpendicular to the normal forward direction of travel of the vehicle, but need not be connected by a common axle. The front wheel arrangement is spaced apart from the rear wheel arrangement, in a direction generally parallel with the normal forward direction of travel of the vehicle.

In some embodiments of the invention, sensors other than inertial sensors (e.g. some or all of the non-inertial sensors discussed above) are used to determine whether the vehicle 1 is airborne, and no inputs from inertial sensors are used to reach a determination as to whether the vehicle 1 is airborne.

In this specification reference is made to a road surface over which the vehicle is driven. It should be understood that this term encompasses any outdoor or indoor surface, including off-road surfaces.

It will be appreciated that embodiments of the present invention provide a robust and reliable system for indicating whether a vehicle is airborne, and to assist in deploying appropriate safety measures if such a determination is made.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

While the above description constitutes the preferred embodiment of the present invention, it will be appreciated that the invention is susceptible to modification, variation, and change without departing from the proper scope and fair meaning of the accompanying claims.

The invention claimed is:

1. A safety system for a motor vehicle having at least a front wheel arrangement having one or more wheels and a rear wheel arrangement having one or more wheels, the system comprising:
   a control unit;
   one or more vehicle inertial sensors to detect acceleration experienced by the vehicle, the one or more vehicle inertial sensors being connected to the control unit so the control unit receives output signals from the one or more vehicle inertial sensors; and
   one or more vehicle safety systems which may be activated by the control unit,
   wherein the control unit is configured to process the output signals received from the one or more vehicle inertial sensors and to determine whether at least one of the wheels of the front and the rear wheel arrangements is not in contact with the surface over which the vehicle is driven;
   wherein the one or more vehicle inertial sensors include a longitudinal acceleration sensor and a vertical acceleration sensor and the control unit makes a determination that one or more of the wheels of the front and the rear wheel arrangements is not in contact with the surface if a vertical acceleration of the vehicle exceeds a predetermined vertical acceleration threshold of the vehicle and a longitudinal acceleration of the vehicle is below a predetermined longitudinal acceleration threshold.

2. The system according to claim 1, wherein the one or more vehicle inertial sensors include a vertical acceleration sensor, and wherein the control unit makes a determination that at least one of the wheels of the front and the rear wheel arrangements is not in contact with the surface if a vertical acceleration of the vehicle exceeds a predetermined vertical acceleration threshold.

3. The system according to claim 1 wherein the one or more vehicle inertial sensors include a pitch sensor, and the control unit makes a determination that at least one of the wheels of the front and the rear wheel arrangements is not in contact with the surface if a rate of pitch of the vehicle exceeds a predetermined pitch threshold.

4. The system according to claim 1, wherein the control unit is operable to confirm a determination that one or more of the wheel arrangements is not in contact with the surface if the conditions leading to a determination that at least one of the wheels of the front and the rear wheel arrangements is not in contact with the surface persist in excess of a predetermined length of time.

5. The system according to claim 4 wherein the control unit is operable if the control unit makes a confirmed determination that one or more of the wheels of the front and the rear wheel arrangements is not in contact with the surface, to calculate an estimated severity of an impact when the one or more of the wheel arrangements vehicle makes contact with the surface again.

6. The system according to claim 5, wherein the estimated severity is based on the kinetic energy accumulated by the vehicle.

7. The system according to claim 5, wherein the vehicle safety system is in the form of a reversible or irreversible seatbelt pretensioner which may be activated by the control unit, while the one or more of the wheels of the front and the rear wheel arrangements is not in contact with the surface, if the estimated severity of the impact exceeds a predetermined threshold.

8. The system according to claim 7, wherein-the one or more vehicle inertial sensors includes a pitch sensor, and wherein the reversible or irreversible seatbelt pretensioner is activated by the control unit, while the one or more of the wheel arrangements is not in contact with the surface, if the estimated severity of the impact is above a predetermined threshold, and the pitch angle of the vehicle measured by exceeds a predetermined threshold.

9. The system according to claim 1 wherein:
   the one or more vehicle safety system is at least one front air-bag and a reversible or irreversible seatbelt pretensioner; and
   if a determination is made that one or more of the wheels of the front and the rear wheel arrangements is not in contact with the surface, the control unit is adapted to make a determination as to whether the front air-bag will triggered when the vehicle strikes the surface, and the control unit is operable to activate, while the one or more of the wheels of the front and the rear wheel arrangements is not in contact with the surface, the reversible or irreversible seatbelt pretensioner if it is determined that the front air-bag will be triggered.

10. The system according to claim 9 wherein the vehicle further comprises an occupant out of position sensor, and wherein the seatbelt pretensioner will be activated if it is determined that the front air-bag will be triggered and the occupant is out of position.

11. The system according to claim 1 wherein a seatbelt pretensioner is activated if a confirmed determination is made that one or more of the wheels of the front and the rear wheel arrangements is not in contact with the surface, and the vehicle inertial sensors indicate that the one or more of the wheels of the front and the rear wheel arrangements has made contact with the surface again.

12. A safety system for a motor vehicle having at least a front wheel arrangement having one or more wheels and a rear wheel arrangement having one or more wheels, the system comprising:
   a control unit;
   one or more vehicle inertial sensors to detect acceleration experienced by the vehicle, the one or more vehicle inertial sensors being connected to the control unit so the control unit receives output signals from the one or more vehicle inertial sensors; and
   one or more vehicle safety systems which may be activated by the control unit,
   wherein the control unit is configured to process the output signals received from the one or more vehicle inertial sensors and to determine whether at least one of the wheels of the front and the rear wheel arrangements is not in contact with the surface over which the vehicle is driven;

wherein the one or more vehicle inertial sensors include a pitch sensor and a longitudinal acceleration sensor for measuring the longitudinal acceleration of the vehicle;

wherein the control unit makes a determination that at least one of the wheels of the front and the rear wheel arrangements is not in contact with the surface if a pitch rate of the vehicle exceeds a predetermined pitch threshold and the pitch rate is substantially not correlated with the longitudinal acceleration of the vehicle.

13. The system according to claim 12, wherein the one or more vehicle inertial sensors includes a vertical acceleration sensor and the control unit makes a determination that one or more of the wheels of the front and the rear wheel arrangements is not in contact with the surface if a vertical acceleration of the vehicle exceeds a predetermined vertical acceleration threshold of the vehicle and a longitudinal acceleration of the vehicle is below a predetermined longitudinal acceleration threshold.

14. The system according to claim 13 wherein the vertical acceleration threshold is reduced if the longitudinal acceleration of the vehicle is below a further predetermined longitudinal acceleration threshold.

15. The system according to claim 12, wherein the one or more vehicle inertial sensors includes at least one of a vertical acceleration sensor for measuring the vertical acceleration of the vehicle, a pitch sensor for measuring the pitch of the vehicle, and a longitudinal acceleration sensor for measuring the longitudinal acceleration of the vehicle, the one or more vehicle inertial sensors being connected to the control unit so the control unit receives output signals from the one or more vehicle inertial sensors;

the one or more safety systems includes one or more of a reversible or irreversible seatbelt pre-tensioner and an airbag, and wherein the control unit is configured to process the output signals received from the one or more vehicle inertial sensors and to determine whether at least one of the wheels of the front and the rear wheel arrangements is not in contact with the surface over which the vehicle is driven and activate the one or more vehicle safety systems;

wherein the seatbelt pretensioner will be activated if it is determined that the front air-bag will be triggered and the occupant is out of position.

16. The system according to claim 15, wherein the control unit is operable to confirm a determination that one or more of the wheel arrangements is not in contact with the surface if the conditions leading to a determination that at least one of the wheels of the front and the rear wheel arrangements is not in contact with the surface persist in excess of a predetermined length of time.

17. The system according to claim 15, wherein:

the one or more vehicle safety system includes both of the front air-bag and the reversible or irreversible seatbelt pretensioner; and if a determination is made that one or more of the wheels of the front and the rear wheel arrangements is not in contact with the surface, the control unit is adapted to make a determination as to whether the front air-bag will triggered when the vehicle strikes the surface, and the control unit is operable to activate, while the one or more of the wheels of the front and the rear wheel arrangements is not in contact with the surface, the reversible or irreversible seatbelt pretensioner if it is determined that the front air-bag will be triggered.

* * * * *